UNITED STATES PATENT OFFICE.

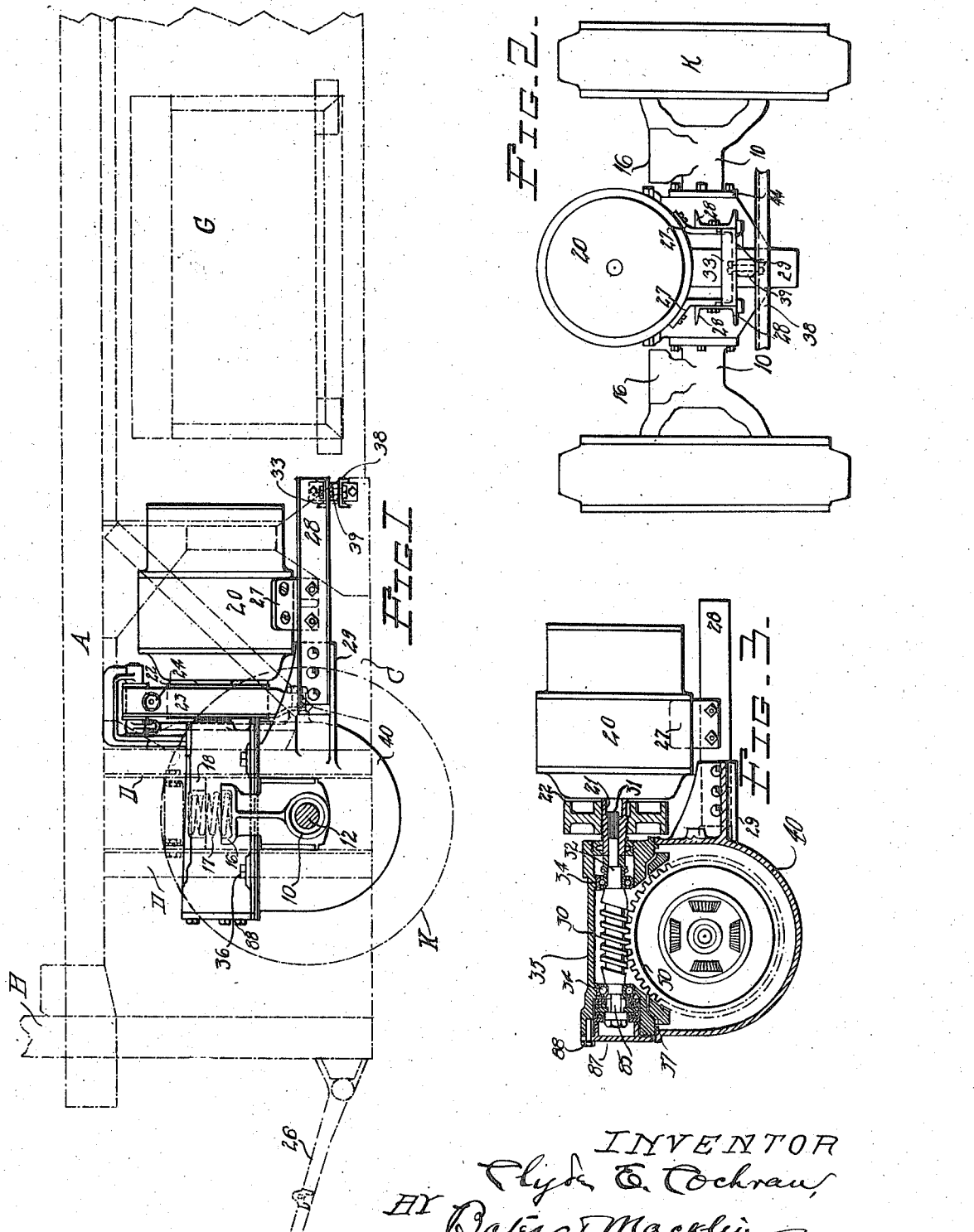

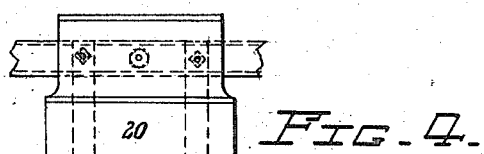
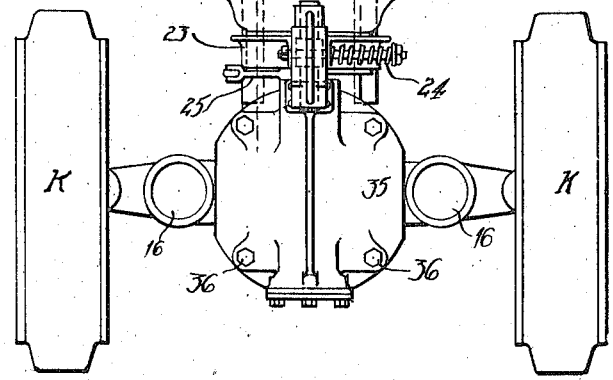
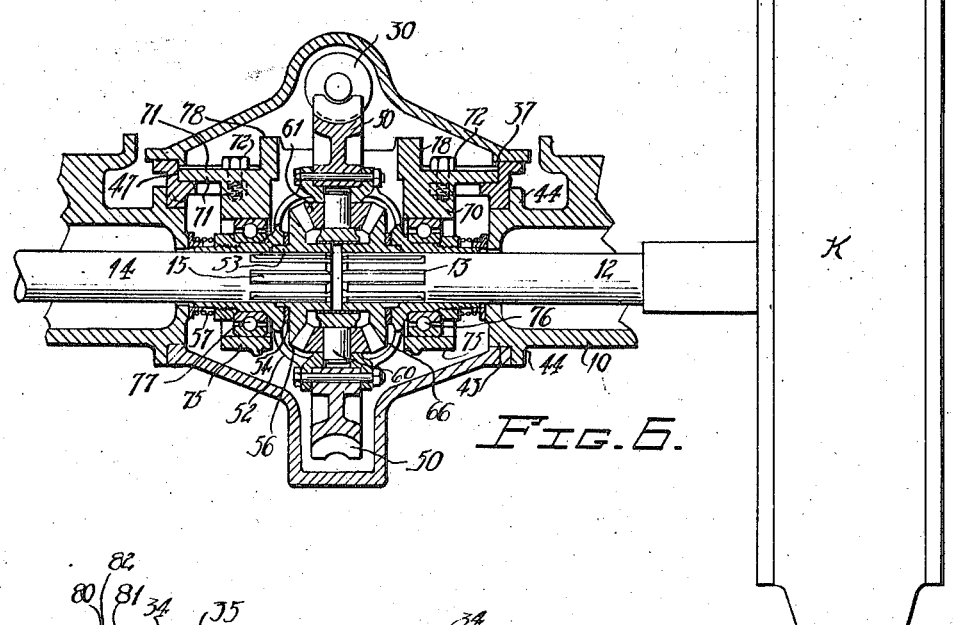
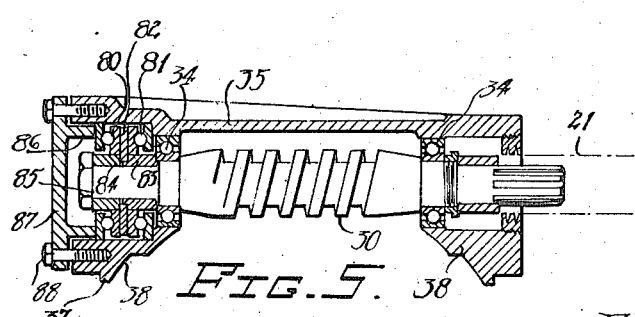

CLYDE E. COCHRAN, OF CLEVELAND, OHIO, ASSIGNOR TO THE ELWELL-PARKER ELECTRIC COMPANY, OF CLEVELAND, OHIO, A CORPORATION OF OHIO.

DRIVING MECHANISM FOR MOTOR-VEHICLES.

1,233,846.   Specification of Letters Patent.   Patented July 17, 1917.

Application filed December 15, 1916. Serial No. 137,247.

*To all whom it may concern:*

Be it known that I, CLYDE E. COCHRAN, a citizen of the United States, residing at Cleveland, in the county of Cuyahoga and State of Ohio, have invented a certain new and useful Improvement in Driving Mechanism for Motor-Vehicles, of which the following is a full, clear, and exact description, reference being had to the accompanying drawings.

This invention relates to motor vehicles and particularly to driving mechanisms of a type wherein the driving motor housing, transmission gearing housing, and housings for the driving axles are all rigidly connected together. An essential object of the invention is to so construct such housings and driving mechanisms as to render the parts most easily accessible for inspection, repair, etc., as well as to enable them to be readily assembled and disassembled. In carrying out my invention I prefer to use a differential gear of the usual type driven by a worm wheel, which in turn is driven by a worm directly connected with the armature shaft of a motor, and a specific object of this invention is to so construct the mountings and housings for the axles, differential gearing and worm gear that the worm gear and motor may be disconnected without disturbing the differential gearing and axle housings.

Other objects will become apparent in the specification. The essential characteristics of this invention are summarized in the claims.

In the drawings, Figure 1 is a side elevation of a motor and transmission gearing housings showing the manner of mounting the same in an electric truck, the outline of which is illustrated in broken lines; Fig. 2 is a rear elevation of the motor and housings for the gearing and axles; Fig. 3 is a sectional view taken through the housings illustrating the removable portion; Fig. 4 is a plan showing the arrangement of the motor gearing and axle housings; Fig. 5 shows the driving worm removed with its individual housing; Fig. 6 is an axial section through the axle housing and the housing for the differential gearing.

Designating the parts of my invention by reference characters, the truck frame is shown as comprising a platform A, upright end members B and horizontal bottom cords C which are connected to the platform by uprights D and E, the uprights D are shown as arranged in pairs and slidably embracing the opposite sides of an axle housing member 10. Below the platform A is indicated a suitable battery box G. The axle member 10 carries at its outer end, wheels K preferably pivoted on vertical axes and so connected with the driving axles that these wheels may be turned to steer the truck.

The axle members 10 are shown as housings surrounding driving shafts 12 and 14 so connected with the wheels that they may drive the same while allowing them to be swung on the vertical axes. The housings are shown as carrying integral abutments 16 adapted to receive the ends of springs 17 acting on transverse members 18 secured to the uprights D and allowing the wheel, axle housings and motor to move vertically.

A suitable motor 20 carries on its armature shaft 21 a brake drum 22 surrounded by brake shoe members 23 pivoted together below the drum and drawn together by a spring 24, which acts to apply the brake. The spring is compressed to release the brake by a lever 25 acting on a cam adapted to separate the brake shoes at their free ends, and this lever is actuated through connections not shown by a brake platform 26, which, when depressed, releases the brake, permitting the free running of the parts.

The motor 20 is shown as supported on outwardly extending clips 27 bolted to rearwardly extending parallel channel bars 28, which are in turn bolted to rearwardly extending bracket members 29 integral with a housing 40. The rearwardly extending arms 28 are preferably secured to the truck frame in such a manner as to provide a suitable reaction point for the driving truck. As shown the securing means comprises a transverse bar 33 secured between the ends of the bars 28 and connected to a bar 38 extending transversely of the truck frame and a single bolt extending through a distance sleeve 39 preferably slightly rounded on the ends and loosely embracing the bolt, whereby the motor and axle may move with relation to the frame to allow the spring action described.

The armature shaft 21 is shown as having a splined connection at 31 with a driving worm 30 having its shaft 32 mounted in ball bearings 34 secured in a housing cover 35. The housing is shown as entirely inclosing the worm forming an oil-tight chamber with the housing 40, which is an integral member surrounding the differential gearing to be described. The housing 40 is open at the upper side while the housing 35 for the worm 30 flares outwardly and downwardly from the worm and meets the housing 40, closing the opening and being secured thereto by suitable bolts indicated at 36. To accurately position the worm with relation to the gearing driven thereby, the housing 35 is provided with an inwardly extending flange 37 engaging the inner wall of the housing 40 adjacent the opening, as shown particularly in Fig. 6.

At each side of the housing member 40 I have shown openings 43 adapted to receive the ends of the housing members 10 which closely fit these openings and are secured thereto by suitable bolts extending through flanges 44 on the housings 10.

The worm 30 is shown as meshing with a worm gear 50 rigidly carried on a spider 52 comprising two parts bolted to the worm gear and having laterally extending hub portions rotatably embracing the ends of the shafts 12 and 14. The hubs abut non-friction washers 54 at their inner sides. The washers are shown as carried on the hubs of gears 56 and 66 splined to the fluted ends 13 and 15 of the shafts 12 and 14. The two halves of the spider 52 embrace the outer ends of radial studs 60 preferably integral with a ring positioned by the hubs of the gears 56 and 66, and these radial studs carry differential driving pinions 61 engaging at their outer sides the gears 56 and 66. At 57 are shown springs surrounding the hubs of the spider which press washers against the contracted ends of the axle members 10, forming an oil-tight joint, whereby the chamber surrounding the differential gearing may be packed with a suitable lubricant while these washers prevent such a lubricant escaping through axles 10.

The operation of the gearing described is that of the well known differential gearing. The rotation of the worm 30 normally transmitting substantially equal rotation through the worm gear 50, spider 52, spindles 60 and pinions 61, through the gears 56 and 66, rotating the driving wheels K, thus propelling the truck in either direction desired.

It is necessary to firmly mount bearings for the inner ends of the shafts 13 and 14 in the housing, and so connect these bearings with the housing that the parts may be readily assembled, and it is an object of this invention to provide that the worm 30 with its housing 35 may be readily disconnected and removed without disturbing the differential gearing or the connection between the housing for this gearing and the axle housings.

To permit the ready removal of the worm and its housing without disturbing the differential gearing, the housing therefor and the axle housings, it is necessary to provide suitable bearing supports for the differential gearing and the adjacent ends of the axles, which supports are carried independently of the worm gear housing. To accomplish this, the mountings for the differential gearing and the bearings for the axles are formed within and made rigid with the differential gearing housing, while the worm gear and its housing is so arranged that it may be brought into exact operative relation with the worm gear and positioned by the housing, or may be removed therefrom without disturbing these mountings and bearing supports.

In the construction for accomplishing this, I provide a bridge member 70 having an outwardly extending flange 71 closely fitting an annular shoulder at the upper portion of the housing 40 and resting upon a horizontal shoulder 47 formed in the housing. This bridge member is secured in position, tightly resting against these shoulders, by screws 72 extending into lugs formed in the housing, below the flange 71. The bridge is provided with depending bearing supports 74 and 75 for the shafts 12 and 14 respectively. These supports are shown as carrying ball bearings 76 and 77 which embrace the hubs 53 of the spider 52, which in turn have a loose running fit with the shafts 12 and 14. An upwardly extending flange 78 is provided on this bridge portion 70 at each side of an opening for the worm gear 50, to strengthen the bridge member.

As previously stated, it is desirable to remove the worm and its housing for inspection of the parts, repair or to repack the differential housing with grease, and accordingly the housing 35 is made to carry the bearings which center the worm as well as those receiving its end thrust for driving in either direction.

Referring particularly to Figs. 3 and 5, it will be noted that the housing is provided with alined bearing supports 38 for carrying the ball bearings 34 previously mentioned. These bearing supports are also formed integral with the walls of this housing member. At the end of the worm opposite the motor shaft I have shown ball bearings 80 and 81, one ball race of each abutting a ring 82 rigidly carried between two collars 83 and 84, secured on the worm shaft 85. These collars 83 and 84 carry this ring 82 so that it may transmit the end thrust to the ball bearings in either direction, and these collars center one ball race of each ball bearing, while, as shown, the inner and outer ball-races are firmly mounted in a suitable cavity 81 in the end of the housing. The inner ball race rests against a shoulder to receive the end thrust toward the same while pressure against the outer ball race is received by a flange 86 formed on the cap 87 secured to the housing by bolts 88.

Fig. 3 shows the worm and its housing removed, which is intended to illustrate the convenience of such removal and the manner of avoiding the necessity of entirely disassembling the gearing and axle housings to repack with lubricant or inspect the same. To accomplish such removal it is only necessary to disconnect the supporting brackets 27 from the rearwardly extending arms 28 and slide the motor rearwardly along these arms to disconnect the armature shaft of the motor from the worm shaft, after which the screws 36 may be removed, whereupon the worm and its housing may be lifted free from the worm wheel 50 and housing 40. It will be noted that in this operation the housing for the differential gearing and axles is not disturbed. When the operation just described is performed with the axle outside of the truck, a suitable block may be placed under the supports 28 to support the motor while being slid along the same.

Having thus described my invention, what I claim is:

1. In a motor vehicle, a driving axle and a housing therefor formed between its ends with an opening at one side, a removable cover for said opening, a driving connection for the axle extending through said opening and including a differential gear, a supporting member secured in said housing independent of the cover and having bearings for the differential gear, a driving member for said differential gear carried by said cover and journaled therein, whereby the cover with its driving member may be removed without disturbing the differential gear.

2. In a motor vehicle, a driving axle having a differential gear between its ends, a housing for said axle and differential gear and having an opening at one side of the differential gear, a removable cover for said opening, said differential gear and axle members being supported by said housing independently of said cover, said differential gear including a toothed driving member, a shaft journaled in said cover and carrying means engaging said toothed driving member for rotating the same, means for driving said shaft, and means for accurately positioning the cover and its shaft with relation to the toothed driving member carried by the housing.

3. In a motor vehicle, the combination of a driving axle, a differential gear therefor between its ends, a housing member surrounding the differential gear and having openings through which the axles extend and an opening at one side thereof, said axle housings being removably secured to the sides of the differential gearing housing, a removable member located within the differential gearing housing and secured thereto and carrying bearings for the differential gear, the differential gear having a toothed driving member, a cover for the opening in said housing, a shaft journaled therein and geared to said toothed driving member, and a motor directly connected to said shaft.

4. In a motor vehicle, the combination of a driving axle, a differential gear between its ends including a worm wheel driving member, a housing for the differential gear having openings around the axles and an opening at one side thereof, axle housings closing the first mentioned openings, a removable cover for the other opening, a shaft and worm journaled in said cover and actuating the worm wheel, and a bridge member extending transversely across the housing beneath the cover and secured to the housing independently of the cover and having bearings for the differential gear and axles.

5. In a motor vehicle, the combination of a driving axle, a differential gear between its ends including a worm wheel driving member, a housing for the differential gear having an opening at one side thereof, a removable cover for said opening, a shaft and worm journaled in said cover and actuating the worm wheel, a bridge member extending transversely across the housing beneath the cover and removably bolted to supporting ledges of said housing and having bearings for the differential gear, and an inwardly projecting flange on the cover for positioning the cover with its worm accurately meshing with the worm wheel.

In testimony whereof, I hereunto affix my signature.

CLYDE E. COCHRAN.